(12) United States Patent
Clarke (10) Patent No.: US 12,151,410 B2
(45) Date of Patent: Nov. 26, 2024

(54) METHOD OF FORMING AN ARTICLE

(71) Applicant: Bockatech Ltd., Huntingdon (GB)

(72) Inventor: Peter Reginald Clarke, Huntingdon (GB)

(73) Assignee: Bockatech Ltd., Huntingdon (GB)

( * ) Notice: Subject to any disclaimer, the term of this patent is extended or adjusted under 35 U.S.C. 154(b) by 171 days.

(21) Appl. No.: 17/799,760

(22) PCT Filed: Mar. 2, 2021

(86) PCT No.: PCT/EP2021/055105
§ 371 (c)(1),
(2) Date: Aug. 15, 2022

(87) PCT Pub. No.: WO2021/175808
PCT Pub. Date: Sep. 10, 2021

(65) Prior Publication Data
US 2023/0072051 A1    Mar. 9, 2023

(30) Foreign Application Priority Data

Mar. 3, 2020 (GB) .................................... 2003070

(51) Int. Cl.
    *B29C 44/06*      (2006.01)
    *B29C 44/02*      (2006.01)
    (Continued)

(52) U.S. Cl.
    CPC ............ *B29C 44/06* (2013.01); *B29C 44/027* (2013.01); *B29C 44/3415* (2013.01);
    (Continued)

(58) Field of Classification Search
CPC .................................................... B29C 44/06
See application file for complete search history.

(56) References Cited

U.S. PATENT DOCUMENTS 3,126,139 A * 3/1964 Schechter ............... B29C 48/19
                                                      264/45.9
4,900,489 A * 2/1990 Nagase ................... B29C 44/06
                                                      264/46.7

(Continued)

FOREIGN PATENT DOCUMENTS

EP          0787581 A1     8/1996
EP          0787584 A1     1/1997

(Continued)

OTHER PUBLICATIONS

Combined Search and Examination Report under Section 17 and 18(3) in related GB Application No. 2003070.6 issued on Dec. 14, 2020.

(Continued)

*Primary Examiner* — Andrew D Graham
(74) *Attorney, Agent, or Firm* — Polsinelli, P.C.

(57) ABSTRACT

A method of forming an article by controlling the thickness of a portion of the plastic composition which comprises a layer of molten plastic composition between opposite first and second solid skins, so that the thickness is constant with a very low tolerance of +/−0.5%, preferably +/−0.2%, when the portion is subsequently exposed to a reduced pressure to cause expansion of the layer of molten plastic composition to form a core layer of expanded cellular foam between the first and second solid skins, and by controlling the stretch of the first solid skin to be within the range of 0.5 to 3%, the expansion of the plastic composition can be highly uniformly controlled in the expanded wall parts.

18 Claims, 8 Drawing Sheets

(51) Int. Cl.
  *B29C 44/34* (2006.01)
  *B29C 44/42* (2006.01)
  *B29K 23/00* (2006.01)
  *B29L 31/00* (2006.01)
(52) U.S. Cl.
  CPC .......... *B29C 44/42* (2013.01); *B29K 2023/12* (2013.01); *B29L 2031/7132* (2013.01)

(56) References Cited

U.S. PATENT DOCUMENTS

| | | | | |
|---|---|---|---|---|
| 5,328,651 | A * | 7/1994 | Gallagher | B29C 49/22 264/513 |
| 6,146,564 | A * | 11/2000 | Beckmann | B29C 44/586 264/46.4 |
| 6,402,725 | B1 * | 6/2002 | Clarke | B29C 44/04 30/340 |
| 6,599,452 | B1 * | 7/2003 | Ferguson | B29C 44/58 264/225 |
| 6,849,218 | B1 * | 2/2005 | De Winter | B29C 37/0032 264/254 |
| 10,889,034 | B2 * | 1/2021 | Bocking | B29C 44/027 |
| 11,446,849 | B2 * | 9/2022 | Clarke | B29C 44/0407 |
| 2001/0036971 | A1 * | 11/2001 | Usui | B29C 44/0415 521/50 |
| 2003/0041955 | A1 * | 3/2003 | Spengler | B29C 43/203 156/196 |
| 2004/0062885 | A1 * | 4/2004 | Imanari | C08J 3/226 428/34.1 |
| 2004/0256878 | A1 * | 12/2004 | Rave | B29C 44/06 296/70 |
| 2005/0194713 | A1 * | 9/2005 | Erickson | B29C 44/06 264/255 |
| 2009/0104420 | A1 * | 4/2009 | Nadella | B29C 44/0484 428/218 |
| 2009/0220809 | A1 | 9/2009 | Bertheol et al. | |
| 2010/0132109 | A1 * | 6/2010 | Kim | B29C 41/20 4/584 |
| 2012/0066830 | A1 * | 3/2012 | Kim | B29C 44/06 4/584 |
| 2015/0298369 | A1 * | 10/2015 | Nicolai | B29C 44/3415 428/419 |
| 2015/0328830 | A1 * | 11/2015 | Ferguson | B32B 7/04 264/46.5 |
| 2017/0274588 | A1 * | 9/2017 | Maué | B29C 70/66 |
| 2018/0319062 | A1 * | 11/2018 | Jindai | B29C 45/26 |
| 2019/0061208 | A1 * | 2/2019 | Bocking | B60J 10/70 |
| 2020/0290245 | A1 * | 9/2020 | Minamigawa | B32B 1/00 |
| 2020/0398464 | A1 * | 12/2020 | Ichiki | B29C 44/06 |

FOREIGN PATENT DOCUMENTS

| | | |
|---|---|---|
| EP | 0934147 B1 | 10/1997 |
| WO | 2017/134181 A1 | 8/2017 |

OTHER PUBLICATIONS

International Search Report and Written Opinion in related international application No. PCT/EP2021/055105 issued on May 19, 2021.

"Selective Foaming makes parts strong and lightweight", Modern Plastics International, vol. 26, 1996.

International Preliminary Report on Patentability in related international application No. PCT/EP2021/055105 issued on Sep. 6, 2022.

* cited by examiner

METHOD OF FORMING AN ARTICLE

FIELD OF THE INVENTION

The present invention relates to the formation of foamed plastic articles, e.g. cups or containers for liquid and/or food.

BACKGROUND

In the packaging industry, a commonly-used type of disposable cup (for example, take-away coffee cups) is a paper cup with an inner lining of a plastic material, e.g. low-density polyethylene (LDPE). As these cups are made of two different materials which can be difficult and/or costly to separate, their recycling can prove challenging. Furthermore, as there is a seam down one side of the cup where the paper material is joined together, liquid may leak from the area of the join at the rim of the cup when the cup is tilted for consuming the beverage within (particularly when the cup is used in connection with a lid having a mouthpiece through which the beverage passes for consumption).

Efforts have been made in the industry to provide disposable polypropylene cups. In conventional injection moulding a thick wall is required to create some thermal insulation in a cup. Typically, a cellular structure provides the thermal insulation, and a blowing agent is added to the thermoplastic polymer to create a foamed structure to further improve the thermal insulation, and to reduce the density of the foamed wall.

WO-A-2017/134181 discloses an article, and a method of forming the article, in which the article is a polypropylene cup which has expanded region comprising a cellular foam. The production method requires an undulating surface to be provided on at least one moulding surface defining a mould cavity, in order to control the expansion of a central molten polypropylene between opposed solid skins after removal of an outer mould part which has moulded an outer solid skin. The undulating surface effectively divides an annular injected preform into a series of arc-like zones which individually expand, in order to avoid uncontrolled expansion circumferentially around the preform, so that the resultant article has a controlled shape and dimensions. However, a ribbed structure is formed which is non-homogeneous and does not have a uniformly circular cross-section in a sidewall since the outer surface of the sidewall tends to exhibit some residual undulation, and so the outer surface is not highly smooth or a precise geometrical shape. This known method provides a hollow article having high wall strength and low mass, but not a cup having a desired highly smooth surface and a desired precise geometrical shape.

However, despite this prior art disclosure there is still a need to produce foamed plastic articles, e.g. cups or containers for liquid and/or food, which have even smaller wall thickness and even lower mass, and a highly smooth surface corresponding to a desired precise geometrical shape, yet nevertheless have high wall strength, and preferably walls which exhibit good thermal insulation properties, and are composed of a single recyclable material.

SUMMARY OF THE INVENTION

The present invention aims at least partially to overcome the problem of achieving even smaller wall thickness and even lower mass, and an entirely smooth surface corresponding to a desired precise geometrical shape, yet nevertheless high wall strength, and preferably walls which exhibit good thermal insulation properties, in articles composed of a single recyclable material.

The present invention provides a method of forming an article, the method comprising:
(a) providing a mould having a first mould part and a second mould part, the first and second mould parts having respective first and second cavity-forming surfaces;
(b) closing the mould thereby defining a cavity between the first and second cavity-forming surfaces;
(c) injecting a molten plastic composition comprising a polymer and a physical blowing agent into the cavity, wherein the physical blowing agent is a gas dissolved in the polymer, the molten plastic composition being injected at an injection pressure, wherein during or after the injecting step (c), the injected plastic composition in contact with the first and second cavity-forming surfaces is cooled to form first and second solid skins respectively adjacent to and in contact with the first and second cavity-forming surfaces, whereby in at least one region of the cavity is respectively located at least one portion of the plastic composition in which portion at least some of the plastic composition between the first and second solid skins remains molten, wherein the thickness of the respective portion is constant within a tolerance of +/−0.5% based on a nominal thickness of the respective portion;
(d) opening the mould before the molten plastic composition between the first and second solid skins has solidified in the at least one portion, so as to expose the molten plastic composition of the respective portion to an external pressure lower than the injection pressure thereby allowing the molten plastic composition between the first and second solid skins of the respective portion to expand by foaming to form an expanded cellular foam as a result of the molten plastic composition beneath the first solid skin expanding outwardly away from the second solid skin which stretches the first solid skin in the respective portion, wherein the opening step comprises removing the first mould part so that the first solid skin is no longer in contact with the first cavity-forming surface; and
(e) cooling the expanded cellular foam to cause the molten plastic composition between the first and second solid skins of the respective portion to solidify and to form in the article at least one first wall part comprising a core layer of cellular foam between the first and second solid skins,
wherein after the cooling step (e) the length of the first solid skin in the respective portion has stretched, as compared to the first solid skin present prior to the opening step (d), by a stretch ratio of from 0.5 to up to 3%, wherein the stretch ratio is the ratio of the increase in the length of the first solid skin after cooling step (e) based on length of the first solid skin before the opening step (d).

The method of the present invention forms an article having a wall that may have any shape, morphology or function. However, the present invention has particular application in the manufacture of hollow articles, such as a cup, or any other container or vessel for containing a liquid or a food.

The present invention provides the technical effects and advantages that the article formed by the method is easily recyclable and reusable, has a high level of stiffness provided by the expanded wall part(s), and also possesses good thermal insulation properties provided by the expanded wall part(s), yet is very thin and consequently uses a low mass of the plastic composition to produce an article of a given size, for example a cup having a desired volume capacity and has a highly smooth surface corresponding to a desired precise geometrical shape. The article may incorporate unexpanded, or less expanded, areas which can provide structural and/or aesthetic properties to the article; for example the unexpanded, or less expanded, areas may be transparent, or visually clear, whereas the expanded wall part(s) may be translucent or opaque.

The present invention is at least partly predicated on the finding by the present inventor that by controlling the thickness of a portion of the plastic composition which comprises a layer of molten plastic composition between opposite first and second solid skins, so that the thickness is constant with a very low tolerance of +/−0.5%, preferably +/−0.2%, when the portion is subsequently exposed to a reduced pressure to cause expansion of the layer of molten plastic composition to form a core layer of expanded cellular foam between the first and second solid skins, and by controlling the stretch of the first solid skin to be within the range of 0.5 to 3%, the expansion of the plastic composition can be highly uniformly controlled in the expanded wall parts. This means that there is no uncontrolled expansion which in turn means that the expanded wall parts can provide a thinner, more uniform, lower mass wall of the article than in the prior art.

The present inventor has also found that the articles produced by the method of the present invention also have the level of stiffness required for such articles, despite the reduction in the amount of material used therein. It has been found that as the cellular foamed plastic composition, typically a thermoplastic polymer such as a polyolefin, typically polypropylene, cools slowly, due to its thermal insulation qualities, the crystallinity of the plastic composition can increase, which in turn can increase the rigidity of the cellular foamed plastic composition. The expansion of the molten plastic composition between the first and second skins by foaming also provides the articles with good thermal insulation properties.

Also, since the entire container may be made of a single layer of recyclable material (i.e. no layers of different materials which need to be separated), the container is easier to recycle than the commonly used plastic-lined paper cups.

Furthermore, as the articles are injection moulded in the methods of the present invention, there is no join present in the article through which leakage of a liquid contained therein could occur. For example, the sidewall and base of a hollow container can be integrally moulded.

BRIEF DESCRIPTION OF THE DRAWINGS

Embodiments of the present invention will now be described by way of example only with reference to the accompanying drawings, in which.

DETAILED DESCRIPTION

Figure 1:
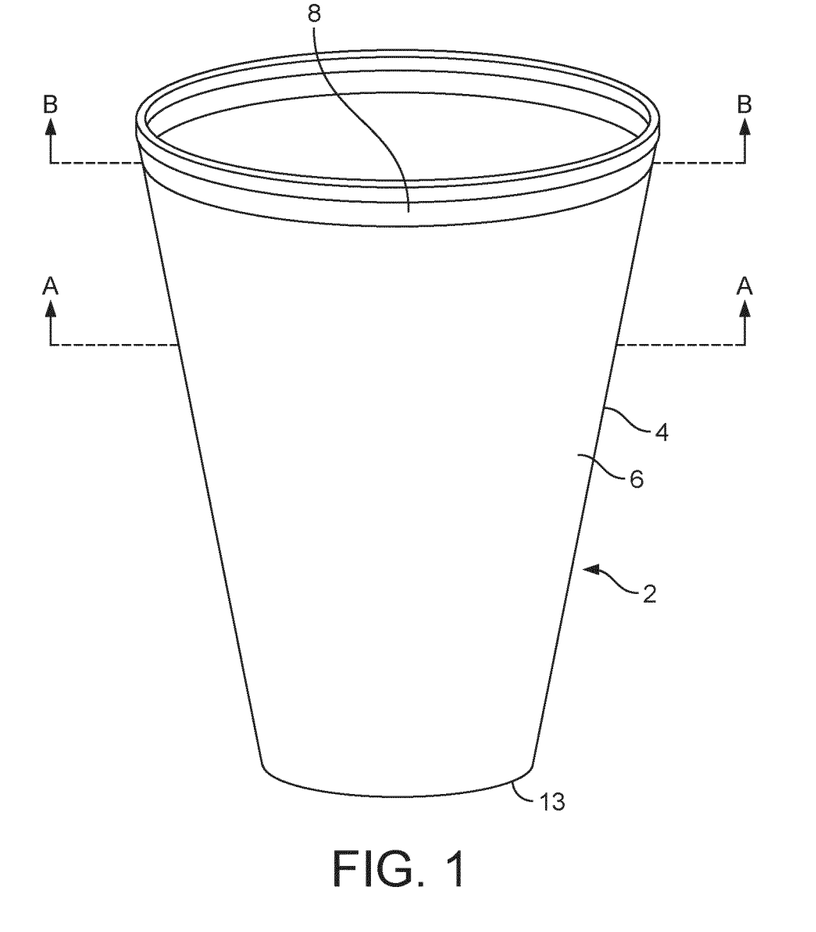
FIG. 1 is a side view of a cup formed by the method of a first embodiment of the present invention.

Referring to FIG. 1, there is shown a side view of an article, for example, a hollow container such as a cup, or example a coffee cup, formed by the method of the present invention.

The cup 2 has an annular sidewall 4 having an annular expanded foam region 6 and an annular unexpanded region 8. In this specification, the term "annular" means "generally ring-like", is not limited to geometrically circular shapes, and encompasses shapes that may be circular or other than circular, for example elliptical, polygonal, etc. The expanded foam region 6 typically has a thickness of from 1 to 2 mm, optionally from 1 to 1.5 mm. The unexpanded region 8 typically has a thickness of from 0.25 to 0.75 mm, optionally from 0.25 to 0.5 mm.

The expanded foam region 6 typically appears translucent to the naked eye because the expanded cellular foam includes cells that have cellular walls that reflect visible light. However, if a pigment is incorporated into the thermoplastic polymer at a high concentration, the expanded region 6 may typically appear opaque, with a solid colour.

In contrast, the unexpanded region 8 has no cells, or if any cells are present, for example at a low concentration, they have a cell size of typically less than 0.5 microns and therefore are not visible to the naked eye, and consequently the unexpanded region 8 appears transparent to the naked eye. The unexpanded region 8 appears transparent to the naked eye, since the blowing agent, in this embodiment $CO_2$ gas, has stayed in solution in the polymer, in this embodiment polypropylene, during manufacture of the article. After the molten polymer has solidified, it is not possible for cells to form as a result of any action of the blowing agent.

The present invention concerns the reliable manufacture of such an article which comprises an expanded foam region 6 and optionally an unexpanded region 8. In some embodiments, substantially the entire area of the article may be composed of an expanded foam region 6.

Figure 2:
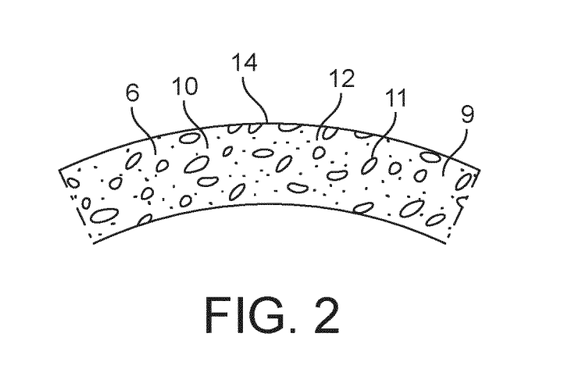
FIG. 2 is a cross-section on line A-A of a first part of the cup of FIG. 1 illustrating the appearance of an expanded translucent region of the cup.

Referring to FIG. 2, there is shown a cross-section on line A-A illustrating the structure of a segment of the expanded region 6 in the article of FIG. 1, in which dimensions are exaggerated for the sake of clarity of illustration. The expanded foam region 6 is a wall part 10 comprising a core layer 12 of cellular foam, comprising hollow cells 11 in a matrix 9, between the first and second solid skins 14, 16.

The hollow container also has an integral base 13. At least one region of at least one, or both, of the annular sidewall 4 and the base 13 is respectively comprised by the wall part 10. Different wall parts 10 of different configurations of the expanded foam may be provided, for example only in the sidewall 4, either throughout the entire sidewall 4 or only in parts of the sidewall 4, and/or in the base 13, either throughout the entire base 13 or only in parts of the base 13.

The method of the present invention to make the article 2 will now be described with reference to FIGS. 3a and 3b.

Figure 3A:
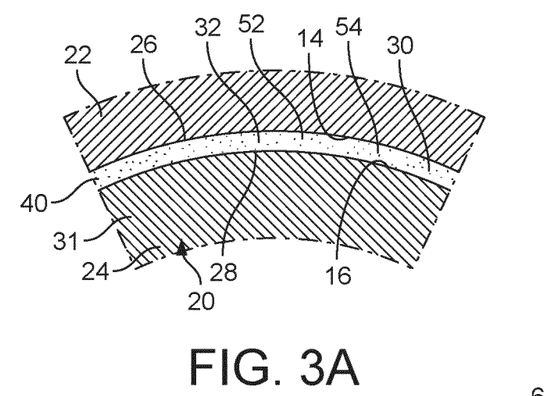
FIGS. 3a and 3b are each a cross-section on line A-A of a mould for forming the expanded cellular foam region of the cup of FIG. 1 at different respective stages in the method of the present invention, FIG. 3a showing an injection step and FIG. 3b showing a cooling step.

Referring to FIG. 3a which shows an injecting step, the article is formed using a mould 20 having a first, outer, mould part 22 and a second, inner, mould part 24. The first and second mould parts 22, 24 have respective first and second cavity-forming surfaces 26, 28, which are annular in the illustrated embodiment. The first cavity-forming surface 26 of the outer mould part 22 and the second cavity-forming surface 28 are macroscopically smooth and without any undulations in a circumferential direction, and in the illustrated embodiment each of the surfaces 26, 28 defines a precise geometric surface which is circular in horizontal cross-section. Since a cup is to be formed the surfaces 26, 28 are also frusto-conical in vertical cross-section.

The mould 20 is closed thereby defining a region 30 of a cavity 32 between the first and second cavity-forming surfaces 26, 28. When the first and second cavity-forming surfaces 26, 28 are circular, and annular, the region 30 of the cavity 32 is correspondingly circular, and annular.

In the illustrated embodiment, the region 30 is in a sidewall-forming portion 31 of the mould 20 and extends to a base-forming portion (not shown) of the mould 20. The region 30 defines most of the sidewall-forming portion 31. However, the region 30 may be otherwise located at any location(s) in the cavity 32 to define wall parts in the final article which are to comprise expanded cellular foam, as described further hereinbelow.

In accordance with the present invention, the first and second cavity-forming surfaces 26, 28 are highly accurately shaped and dimensioned, and also any undesired movement of the first and second mould parts 22, 24 during the moulding operation as described hereinbelow is substantially avoided, so that during the moulding operation the width of the region 30 of the cavity 32 between the first and second cavity-forming surfaces 26, 28 is constant within a tolerance of +/−0.5%, preferably +/−0.2%, based on a nominal, i.e. designed, width.

A molten plastic composition 40, comprising a polymer and a physical blowing agent, is injected into the cavity 32. The physical blowing agent is a gas dissolved in the polymer.

In the embodiment of the present invention, the polymer of the plastic composition may comprise a polyolefin or blend of a plurality of polyolefins, optionally polyethylene or polypropylene; or a polyester, optionally polyethylene terephthalate or polybutylene terephthalate; or polylactic acid. In the preferred embodiment, the polymer comprises polypropylene. Polypropylenes having a Melt Flow Index (MFI) of from 10 to 120 are particularly preferred. The Melt Flow Index of a polymer can be measured according to ASTM D1238.

Blowing agents which can be used in the embodiment of the present invention include physical blowing agents in the form of a gas dissolved in the molten plastic composition. Such a gas may comprise, for example, carbon dioxide. The gas may optionally further include a perfume composition (i.e. a scent) which remains present in the polymer material after expansion, to enhance the consumer experience.

When using carbon dioxide as the blowing agent, $CO_2$ gas is produced by the blowing agent in the extruder of the injection moulding machine, and the $CO_2$ gas then goes into solution during the injection phase (typically from 300 to 500 bar within the mould cavity) due to the relatively high pressure exerted on the material being greater than the pressure required (typically greater than 80 bar.) to force $CO_2$ into solution within molten thermoplastic resin, such as polypropylene.

The molten plastic composition is injected at an injection pressure $P_{injection}$. Typically, the injection pressure $P_{injection}$ is at least 150 bar. At the end of the injecting step, optionally a packing pressure, $P_{packing}$, is applied to the cavity 32. Typically, packing pressure $P_{packing}$ is at least 150 bar.

During or after the injecting step, the injected plastic composition 40 in contact with the first and second cavity-forming surfaces 26, 28 is cooled to form the first and second solid skins 14, 16 respectively adjacent to and in contact with the first and second cavity-forming surfaces 26, 28.

In the region 30 of the cavity 32, there is located a respective portion 52 of the plastic composition 40. In portion 52 of the plastic composition 40, at least some of the plastic composition, in a central layer 54 between the first and second solid skins 14, 16, remains molten.

Since the first and second mould parts 22, 24 provide that during the moulding operation the width of the region 30 of the cavity 32 between the first and second cavity-forming surfaces 26, 28 is constant within a tolerance of +/−0.5%, preferably +/−0.2%, based on a nominal, i.e. designed, width, correspondingly in portion 52 of the plastic composition 40 the thickness of the portion 52 is constant within a tolerance of +/−0.5%, preferably +/−0.2%, based on a nominal, i.e. designed, thickness of the portion 52.

Typically, prior to opening the mould 20 as described further hereinbelow, the portion 52 has a thickness of from greater than 0.5 mm to up to 1 mm.

During the injecting step, and any packing, the injection pressure $P_{injection}$, and any packing pressure $P_{packing}$, respectively, are above a minimum pressure threshold, $P_{threshold}$, in the region 30 of the cavity 32. Typically, the minimum pressure threshold $P_{threshold}$ is 80 bar. This prevents, in the region 30, the physical blowing agent from coming partly out of solution in the polymer so that cellular gas bubbles are not formed in the region 30 during the injecting step, and any packing.

The region 30 of the mould cavity 32 has sufficient thickness, and/or the processing time is so short, that the molten polymer resin in the central layer 54 does not solidify during the injection step, and any subsequent packing. Also, the region 30 can be additionally heated by an external heater to maintain the plastic composition 40 in the central layer 54 in a molten liquid phase. The first mould part 22 may be cooled by a cooling system, for example by a flow of cooling fluid therethrough, to maintain the first mould part 22 at a lower temperature than the second mould part 24. Such temperature control can control the absolute and relative thickness of the central layer 54 and the first and second solid skins 14, 16, so that as described hereinbelow the desired expansion of the central layer 54 and stretching of the first solid skin 14 is achieved.

Figure 3B:
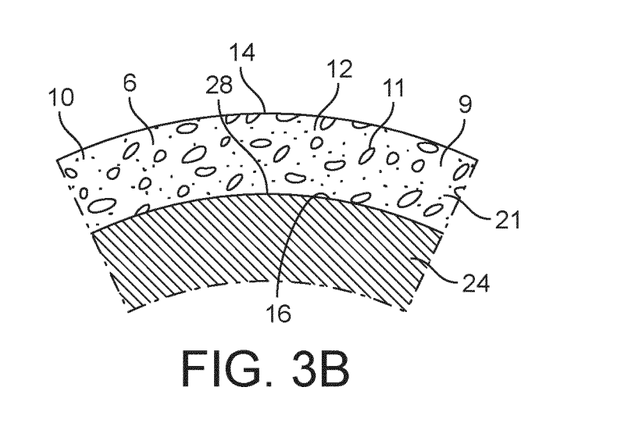

Referring to FIG. 3b, thereafter, the mould 20 is opened before the molten plastic composition 40 in the central layer 54 between the first and second solid skins 14, 16 has solidified in the region 30 of the cavity 32.

During the opening step, at least some of the molten plastic composition 40 in the central layer 54 is exposed to an external pressure lower than the minimum pressure threshold, for example atmospheric pressure, to permit the blowing agent to come out of solution and form gas bubbles within the molten plastic composition 40 in the central layer 54. This action forms in the article 2 the expanded foam region 6 comprising the core layer 12 of expanded cellular foam, between the first and second solid skins 14, 16, formed from the plastic composition 40.

The opening step comprises removing the first mould part 22 so that the first solid skin 14 is no longer in contact with the first cavity-forming surface 26, while maintaining the second solid skin 16 in contact with the second cavity-forming surface 28. In the illustrated embodiment, this opening is achieved by removing the outer mould part 22, exposing the first solid skin 14 to atmospheric pressure and leaving the second skin 16 on the inner part 24.

However any other configuration to open the mould may be used. In particular, in an alternative embodiment at least one or more portions of the inner mould part 24 may be removed from the second solid skin 16 so that the second solid skin 16, or any part thereof, is additionally or alternatively exposed to atmospheric pressure.

This opening step thereby allows the molten plastic composition 40 in the central layer 54 between the first and second solid skins 14, 16 to expand by foaming to form the core layer 12 of expanded cellular foam 21. The expanded cellular foam 21 is formed as a result as a result of the molten plastic composition 40 in the central layer 54 beneath the first solid skin 14 expanding outwardly away from the second solid skin 16. This action is controlled to stretch the first solid skin 14 in the portion 52 by a desired stretch ratio.

Thereafter, in a cooling step the expanded cellular foam 21 is cooled to cause the molten plastic composition 40 in the central layer 54 between the first and second solid skins 14, 16 of the portion 52 to solidify and to form in the article 2 the expanded cellular foam region 6 comprising the core layer 12 of cellular foam 21 between the first and second solid skins 14, 16. The cooling may be carried out passively in the ambient atmosphere, or by active cooling, for example by blowing cool air onto the article 2.

After the cooling step, the wall part 10 typically has a thickness of from 1 to 2 mm. Typically, the portion 52 has increased in thickness by from 1 to 1.5 mm to form the wall part 10 from the opening step to the cooling step.

Prior to the opening step, in the portion 52 the first and second solid skins 14, 16 are curved and parallel, and after the cooling step, in the wall part 10 the first and second solid skins 14, 16 are also curved and parallel.

After the cooling step, the length of the first solid skin 14 in the portion 52 has stretched, as compared to the first solid skin 14 present prior to the opening step, by a stretch ratio of from 0.5 to up to 3%. The stretch ratio is the ratio of the increase in the length of the first solid skin 14 after the cooling step based on length of the first solid skin before the opening step. For example an increase in length of the first solid skin from an initial value of 100 mm to a final value of 102.5 mm would represent a stretch ratio of 2.5%. Preferably the stretch ratio is from 2 to 3%, more preferably from 2.25 to 2.75%, still more preferably from 2.4 to 2.6%, for example about 2.5%.

In accordance with the present invention, the solid skin 14 is stretched as a result of the expansion of the molten plastic composition 40 in the central layer 54 between the first and second solid skins 14, 16 to form the final solidified core layer 12 of cellular foam, comprising hollow cells 11 in a solid matrix 9, between the first and second solid skins 14, 16. This stretching is controlled, in conjunction with the highly uniform thickness of the portion 52 prior to opening the mould 20, so that the stretching is measurable but small and uniform around the circumference of the expanded cellular foam region 6.

The degree of stretching can be controlled by a number of parameters that can readily be determined by the skilled person, for example to control the thickness of the first and second solid skins 14, 16 prior to opening the mould 20, since thicker skins would have a reduced tendency to stretch as a result of the expansion pressure applied to the skins by the expanding molten plastic composition, and to control the expansion pressure applied to the skins by the expanding molten plastic composition by varying the concentration of the blowing agent in the molten plastic composition.

Fundamentally, the present inventor has found surprisingly that by controlling the uniformity of the shape and dimensions of the portion(s) to be expanded and by controlling the degree of stretch of the skin(s) that are subjected to stretching as a result of expansion of the molten plastic composition, in the resultant article the corresponding wall part(s) can exhibit a highly accurate shape, for example a highly accurate concentricity of an annular cross-section, combined with small thickness and low mass. The wall part(s) can also exhibit high strength and thermal insulation properties result from the presence of the core layer of expanded cellular foam.

In contrast, in WO-A-2017/134181 the undulating surface on at least one moulding surface effectively divides an annular injected preform into a series of arc-like zones which individually expand. The undulating surface of the outer solid skin has "peaks and "troughs" and during the expansion the troughs are circumferentially "blown out" so that the shape of the outer skin is modified to become more circular but the length of the outer solid skin is not increased. The length is not increased because prior to opening the mould the outer skin is sufficiently thick and/or the concentration of the blowing agent is sufficiently low, that upon opening there is insufficient blowing pressure to stretch the outer skin. However, by providing the undulating surface, the final sidewall is not uniformly circular, but has a slightly undulating outer surface, as a result of forming upright longitudinal ribs in the final sidewall, and also the final sidewall can be excessively thick.

The present invention solves these problems in WO-A-2017/134181 by controllably stretching the outer skin and controllably providing a constant and uniform thickness of the portion to be expanded. The constant and uniform thickness of the portion to be expanded ensures that a uniform expansion pressure is applied over the entire area of the respective wall or wall part.

By providing a uniform expansion pressure to a portion that has a constant and uniform thickness, this ensures that the expansion is also constant and uniform, so that the final wall or wall part has highly uniform shape, dimensions and configuration. For example, in the cup 2 of FIG. 1, the outer surface of the sidewall is, in a horizontal cross-section, geometrically circular to a high accuracy, and the sidewall has a highly constant wall thickness.

As a result of these improvement, the wall thickness and mass of the article can be reduced, while retaining the required cellular foam layer properties to provide stiffness and thermal insulation to the wall. The present invention can provide a finished article having a sidewall thickness which is substantially constant around the circumference, so that the resultant article has a controlled shape and dimensions, for example a uniformly circular cross-section in a sidewall, and a hollow article having high wall strength and low mass, which has improved properties as compared to the articles disclosed in WO-A-2017/134181.

Figure 4A:
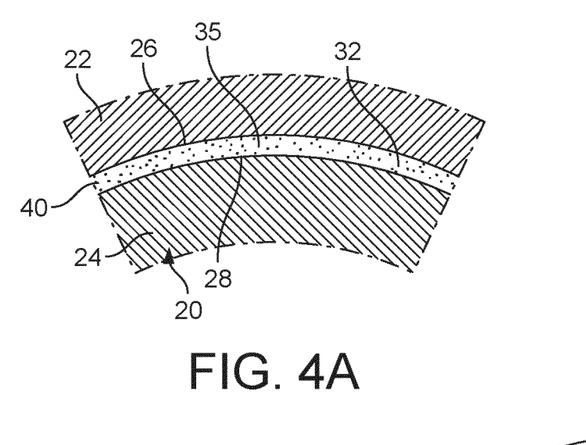
FIGS. 4a and 4b are each a cross-section on line B-B of a mould for forming a second part of the cup of FIG. 1 illustrating the appearance of an unexpanded transparent region of the cup, FIG. 4a showing the injection step and FIG. 4b showing the cooling step.
Figure 4B:
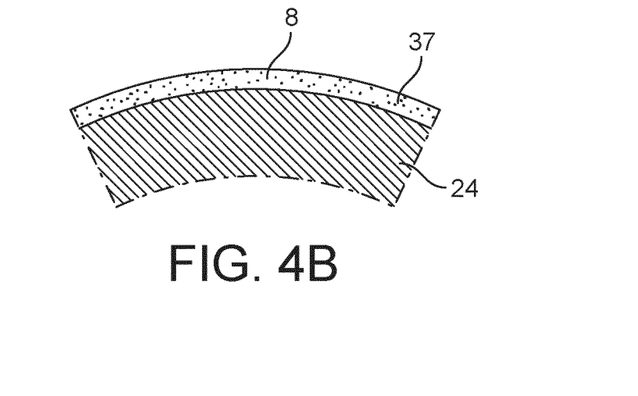

Referring to FIGS. 4*a* and 4*b*, for the unexpanded region 8, the mould 20 is shaped and dimensioned so that a narrow region 35 of the cavity 32 is formed between the first and second cavity-forming surfaces 26, 28. During the injecting step, and optional packing, the injection pressure, the optional packing pressure, are maintained above the minimum pressure threshold in the narrow region 35 of the cavity 32 to maintain the physical blowing agent as a gas dissolved in the molten plastic composition 40 so that substantially no gas bubbles are formed in the narrow region 35 of the cavity 32. Prior to the opening step, the plastic composition 40 in the narrow region 35 of the cavity 32 is cooled so as to be fully solidified, to form in the article 2 at least one the unexpanded region 8 comprising a substantially homogeneous, solid phase, unexpanded plastic composition 37.

This narrow region 35 of the mould cavity 32 is thin, and so the molten polymer resin requires a relatively short time period, shorter than the injection step, and the optional packing, to cool and solidify. Also, this narrow region 35 can be additionally cooled by an external cooler to transition the polymer resin from the molten liquid phase into a solid phase. After the opening step, the solid plastic composition cannot expand further by foaming, and cannot form an expanded cellular foam. Therefore the unexpanded region 8 appears transparent to the naked eye.

Figure 5:
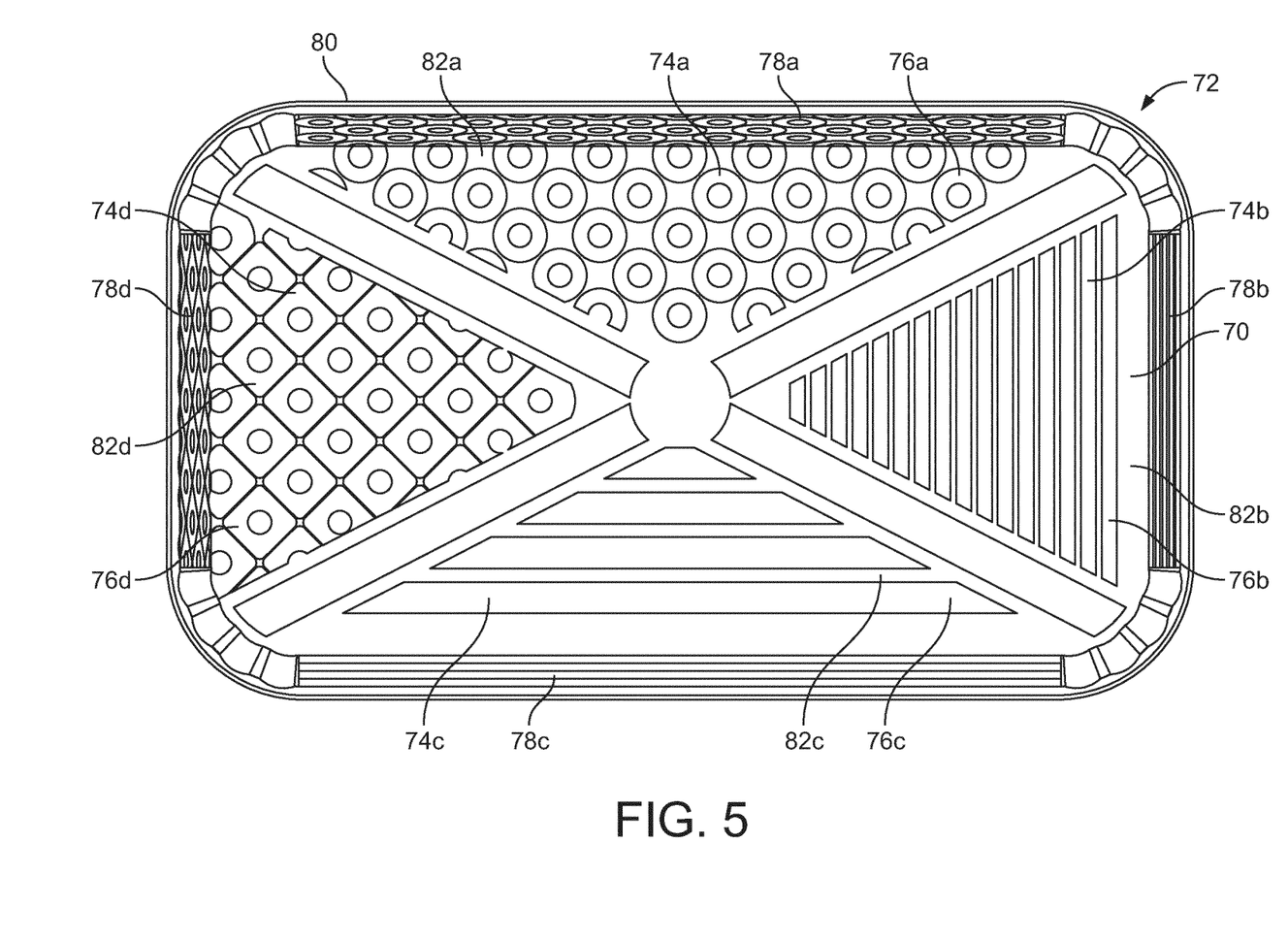
FIG. 5 is a bottom view of a base and sidewall of a food tray formed by the method of a second embodiment of the present invention.
Figure 6:
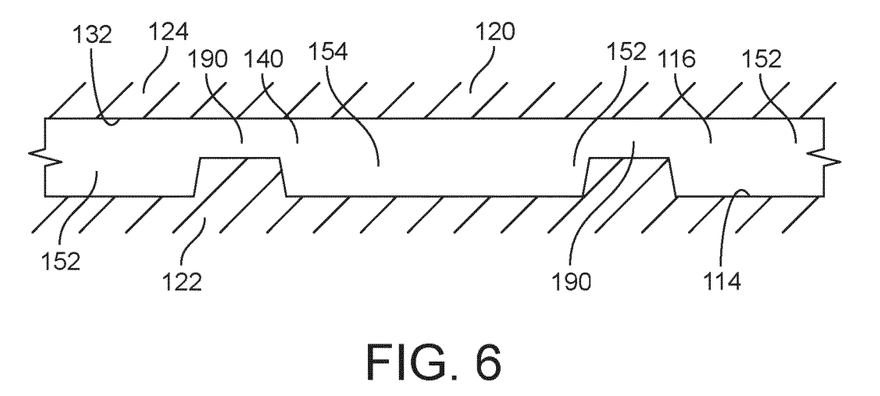
FIG. 6 is a cross-section of part of a region to form the base and/or sidewall of the food tray of FIG. 5 prior to expansion in the opening step.
Figure 7:
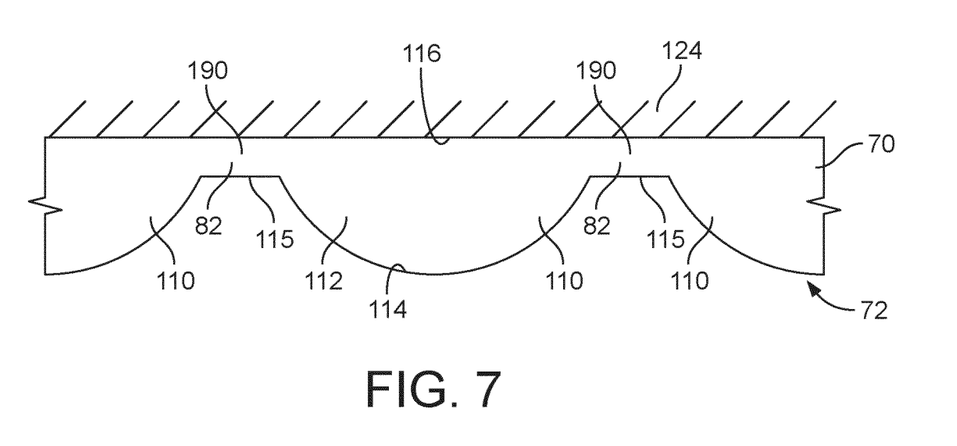
FIG. 7 is a cross-section of part of a region of the base and/or sidewall of the food tray formed from the part shown in FIG. 6 after expansion in the opening step.

Referring to FIGS. 5 to 7, FIG. 5 is a bottom view of a base 70 of a food tray 72 formed by the method of a second embodiment of the present invention. Base 70, and the adjacent parts 78*a*, 78*b*, 78*c*, 78*d* of a sidewall 80, comprises four different regular arrays 74*a*, 74*b*, 74*c*, 74*d* of a plurality of expanded wall parts 76*a*, 76*b*, 76*c*, 76*d*.

Four different arrays 74*a*, 74*b*, 74*c*, 74*d* are shown in a common base 70, and sidewall 80, primarily to illustrate different configurations for the respective arrays 74*a*, 74*b*, 74*c*, 74*d* in accordance with different embodiments of the present invention.

Typically however, only one such array 74*a*, 74*b*, 74*c*, 74*d* is present in the base 70, and sidewall 80, and that one of the illustrated arrays 74*a*, 74*b*, 74*c*, 74*d* extends over substantially the entire area of the base 70, and at least a central area of the respective adjacent part 78*a*, 78*b*, 78*c*, 78*d* of the sidewall 80.

In the illustrated embodiment, the arrays 74*a*, 74*b*, 74*c*, 74*d* are present in the base 70 and the sidewall 80. However, in alternative embodiments, an array 74*a*, 74*b*, 74*c*, 74*d* may be comprised in either one, or both, of the annular sidewall 80 and the integral base 70.

Each of the expanded wall parts 76*a*, 76*b*, 76*c*, 76*d* is spaced from one or more adjacent expanded wall parts 76*a*, 76*b*, 76*c*, 76*d* by an area 82*a*, 82*b*, 82*c*, 82*d* of the plastic composition. The area 82-*a*, 82*b*, 82*c*, 82*d* comprises, between the inner and outer solid skins, a core layer of expanded cellular foam having a lower expansion than the expanded wall parts 76*a*, 76*b*, 76*c*, 76*d* or comprises the plastic composition which is unexpanded throughout its thickness.

FIG. 6 is a cross-section of portion 152 of a region to form the base or sidewall of the food tray of FIG. 5 prior to expansion in the opening step. The portion 152 shown in FIG. 6 is within the mould cavity 132, defined by mould parts 122, 124, prior to opening the mould 120. The portion 152 comprises first outer and second inner solid skins 114, 116 on opposite sides of a central layer 154 of a molten plastic composition 140.

Prior to the opening step, in the portion 152 the first outer and second inner solid skins 114, 116 are planar and parallel. Between the adjacent portions 152, the plastic composition 140 is in the form of a thin layer 190 which is either fully solidified or has a thinner central layer of a molten plastic composition.

FIG. 7 is a cross-section of wall part 110 of a region of the base 70 of the food tray 72 formed from the part shown in FIG. 6 after expansion in the opening step. The wall part 110 comprises first outer and second inner solid skins 114, 116 on opposite sides of a core layer 112 of an expanded cellular foam composed of the plastic composition. After the opening step, in the wall part 110 the second inner solid skin 116 has remained planar, but the first outer solid skin 114 has been stretched so as to be curved and not parallel to the second inner solid skin 116.

Between the adjacent wall parts 110, in the areas 82 the thin layer 190 remains, or the thinner central layer of molten plastic composition has only slightly expanded, so that the areas 82 function as a series of anchor points 115 to prevent excessive or uncontrolled stretching of the first outer solid skin 114.

Figure 8:
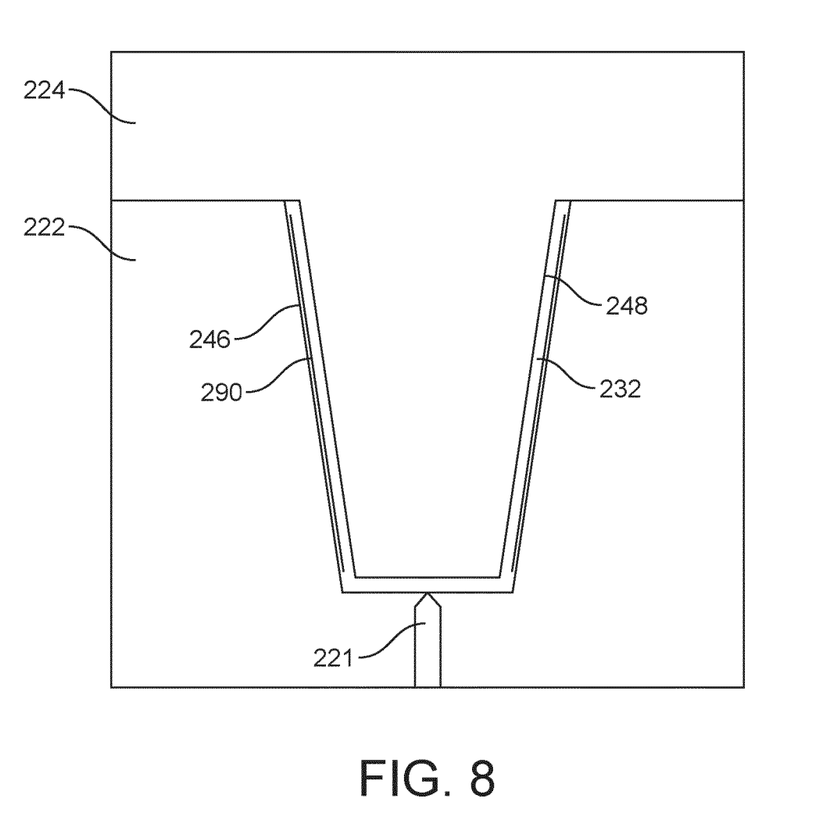
FIG. 8 is a cross-section of a mould for forming a hollow article using in-mould labelling in accordance with a method of a third embodiment of the present invention.
Figure 9:
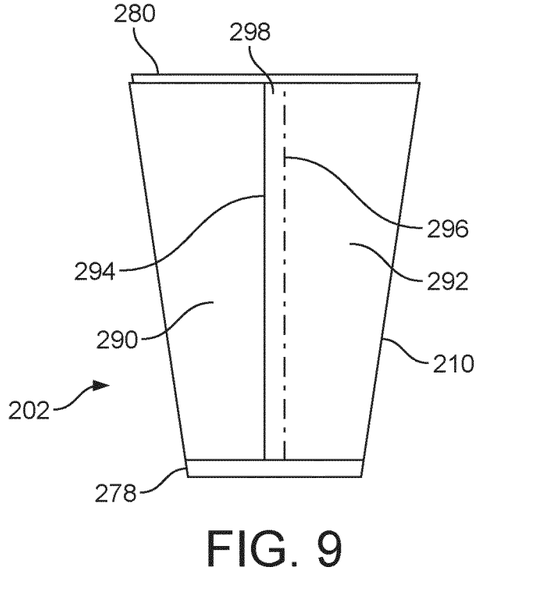
FIG. 9 is a side view of a hollow article having an in-moulded label produced by the mould of FIG. 8.

FIG. 8 is a cross-section of a mould for forming a hollow article using in-mould labelling in accordance with a method of a third embodiment of the present invention. FIG. 9 is a side view of a hollow article having an in-moulded label produced by the mould of FIG. 8. Again, some dimensions are exaggerated for clarity of illustration.

Referring to FIGS. 8 and 9, the first and second mould parts 222, 224 are, respectively, outer and inner mould parts 222, 224 forming outer and inner surfaces 278, 280 of the article 202. The method is modified as compared to the method described with respect to the first embodiment by further comprising the step, before the injecting step from an injector nozzle 221, of providing an in-mould label 290 at least partly surrounding the cavity 232. The in-mould label 290 is located adjacent to the first cavity-forming surface 246 and is radially outward of the second cavity-forming surface 248. Typically, the in-mould label 290 is annular and entirely surrounds the cavity 232. Preferably, the in-mould label 290 is composed of a length of a polymer layer 292 which has opposed ends 294, 296 which are joined together at a seam 298 to form an annular shape, as shown in FIG. 9.

In the third embodiment, the injecting and opening steps are carried out as for the first embodiment. However, after the opening step the in-mould label 290 restricts stretching of the first solid skin formed adjacent thereto. The in-mould label 290 is put into tension as a result of the expansion of the molten central layer to form the solidified core layer of expanded cellular foam and as a result of the stretching of the first, outer, solid skin.

The mechanical properties and dimensions of the in-mould label 290 can be selected to control the stretch ratio of the first, outer, solid skin of the hollow article 202. In this way, the in-mould label 290 functions to control the shape, dimensions and properties of the wall part 210 of the hollow article 202.

Figure 10:
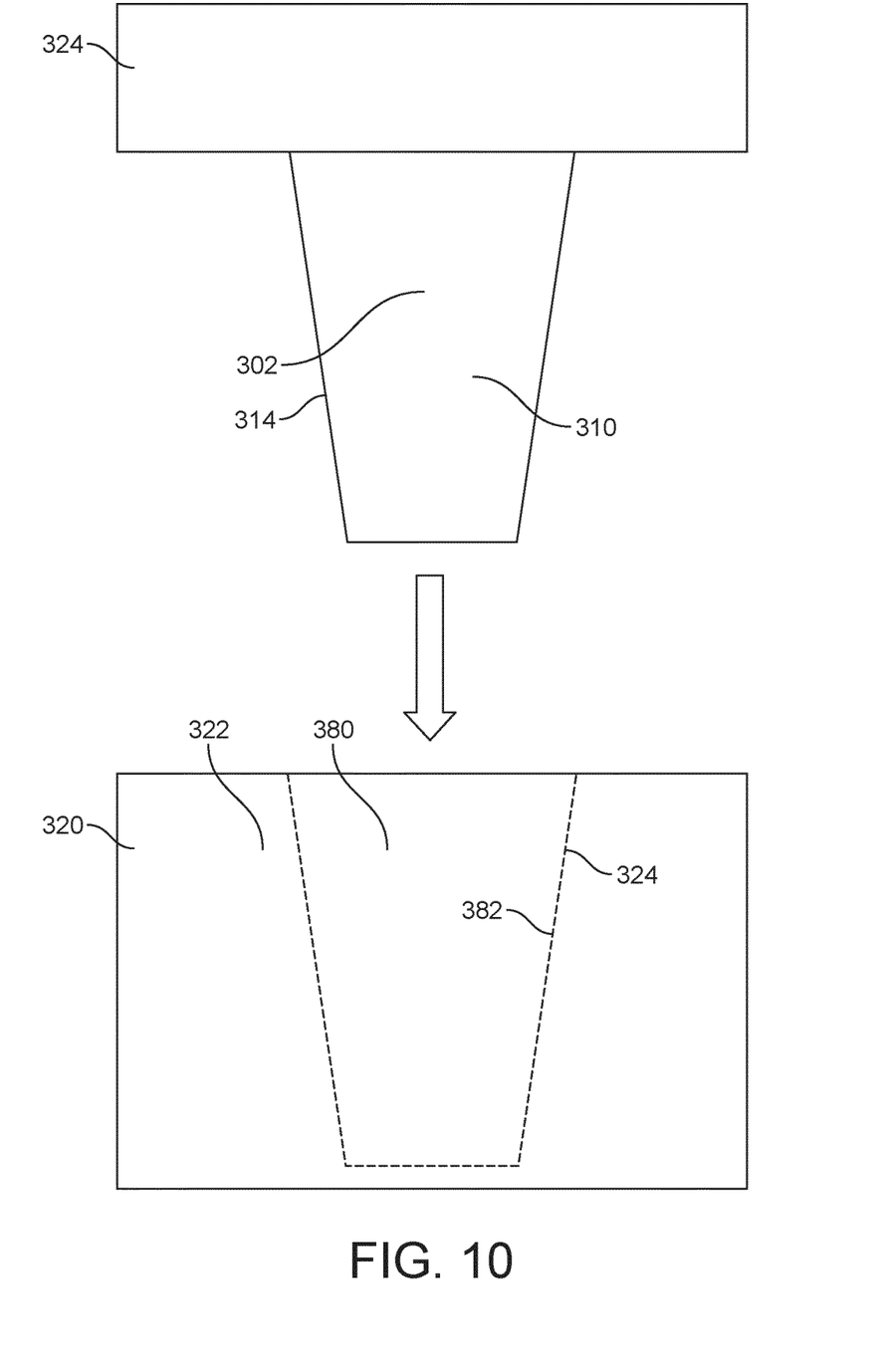
FIG. 10 is a side view, partly in phantom cross-section of a third mould part of a mould, in combination with a second mould part as used in the first embodiment, for forming a hollow article in accordance with a method of a fourth embodiment of the present invention.

FIG. 10 is a side view, partly in phantom cross-section, of a third mould part of a mould, in combination with a second mould part as used in the first embodiment, for forming a hollow article in accordance with a method of a fourth embodiment of the present invention.

In the fourth embodiment, the injecting and opening steps are carried out as for the first embodiment. The intermediate moulded article 302 with a wall part 310 having the first, outer, solid skin 314 is on the second mould part 324 after the first mould part (not shown) has been removed. However, after the opening step and before the cooling step, the moulded article is disposed into a second mould 320 having a third mould part 322. The third mould part 322 has a moulding surface 324. The first, outer, solid skin 314 is placed in contact with the moulding surface 324.

Accordingly, the moulding surface 324 restricts stretching of the first, outer, solid skin 314 in contact therewith after the opening step but before cooling to solidify the molten plastic composition in the central layer to form the solidified core layer of expanded cellular foam.

Typically, during the disposing step the moulding surface 324 compresses the wall part 310 to reduce the thickness of the central layer of molten plastic composition, and thereby to reduce the thickness of the core layer of cellular foam radially inwardly of the first solid skin 314. Consequently, the moulding surface 324 can function to control, and optionally shrink, the length of the first, outer, solid skin 314 in the wall part 310.

In the preferred embodiment, the third mould part 322 is hollow and the moulding surface 324 defines a hollow cavity 380 with a tapered surface 382. During the disposing step, the moulding surface 324 is progressively urged against the first, outer, solid skin 314. This causes compression as described above.

Typically, the third mould part 322 is at a lower temperature than the first mould part that has been removed so that the first solid skin 314 is cooled upon contact with the third mould part 322. The third mould part 322 may be cooled by a cooling system, for example by a flow of cooling fluid therethrough, to maintain the third mould part 322 at a lower temperature than the second mould part 324 on which the hollow article 302 is supported during the disposing of the hollow article 302 into contact with the third mould part 322.

In some embodiments of the present invention, the method may further comprise the step, prior to solidification of the molten plastic composition between the first and second solid skins in the cooling step, of pressing an embossing tool against the first solid skin to impress an inwardly oriented image into the first solid skin by stretching the first solid skin inwardly against the expanded cellular foam. In the embodiment in which the third mould part 322 is pressed against the first solid skin 314, the third mould part 322 may function as the embossing tool. The embossed image may be a pattern, logo, name, etc.

Figure 11A:
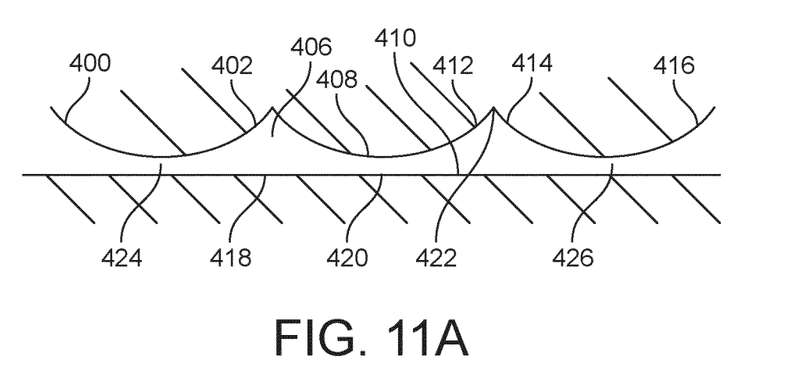
FIGS. 11a and 11b are schematic side cross-sections of a wall of an injected moulded portion at different respective stages in a fifth embodiment of the method of the present invention, FIG. 11a showing the shape and configuration of the first solid skin prior to opening the mould and FIG. 11b showing the shape and configuration of the first solid skin after opening the mould and cooling the expanded cellular foam.
Figure 11B:
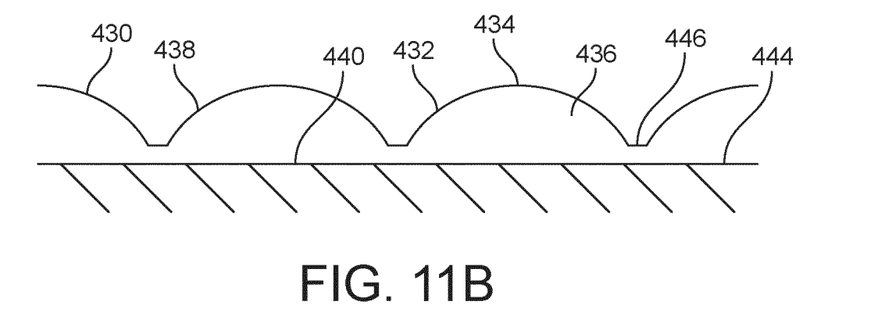

FIGS. 11a and 11b are schematic side cross-sections of a wall of an injected moulded portion at different respective stages in a further embodiment of the method of the present invention. FIG. 11a shows the shape and configuration of the first solid skin prior to opening the mould and FIG. 11b shows the shape and configuration of the first solid skin after opening the mould and cooling the expanded cellular foam.

After the injecting step (c) but prior to the opening step (d), there is formed a regular array 400 of a plurality of wall portions 402 of an intermediate article 404. Each of the wall portions 402 comprises a central layer 406 of the molten plastic composition between the opposed first and second solid skins 408, 410. A three-dimensionally shaped part 412 of the first solid skin 408 defines an outwardly extending convex surface 414 formed by the first cavity-forming surface 416 and a substantially smooth part 418 of the second solid skin 410 formed by the second cavity-forming surface 420.

Prior to the opening step (d), each wall portion 402 of the regular array 400 comprises a central convex peak 422. In addition, prior to the opening step (d), the outwardly extending convex surfaces 414 of the wall portions 402 are spaced from the adjacent outwardly extending convex surfaces 414 of the wall portions 402 by an area 424 of the plastic composition which is a solid layer 426 of the plastic composition extending between, and contacting, the first and second cavity-forming surfaces 416, 420.

Figure 12:
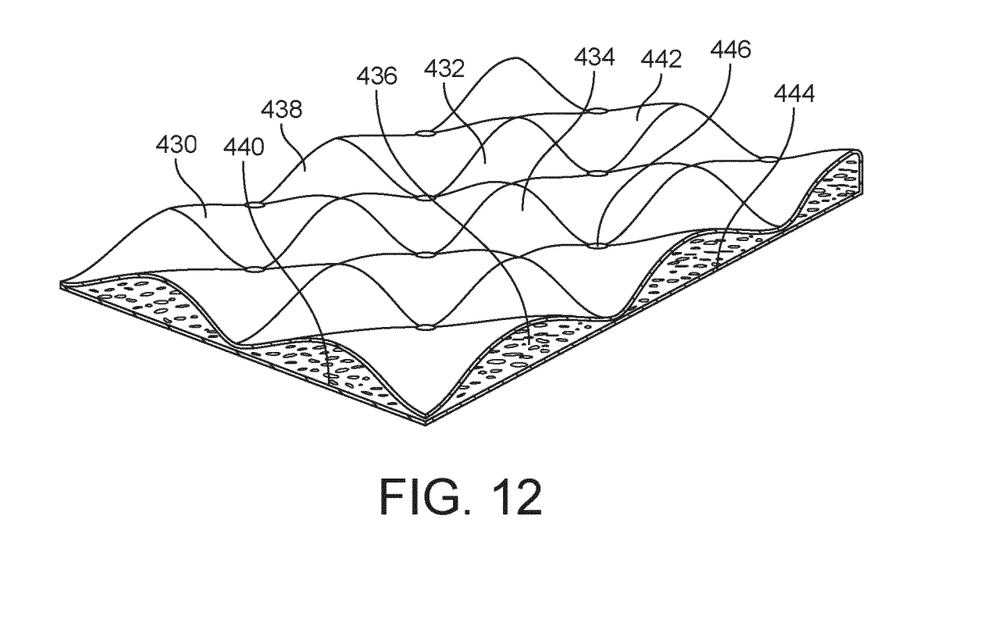
FIG. 12 is a schematic perspective view of a wall of an article formed from the injected moulded portion of FIG. 11a showing the shape and configuration of the first solid skin after opening the mould and cooling the expanded cellular foam.

FIG. 12 is a schematic perspective view of a wall 430 of an article formed from the injected moulded portion of FIG. 11 showing the shape and configuration of the first solid skin 408 after opening the mould and cooling the expanded cellular foam.

During the opening step (d), each wall portion 402 of the regular array 400 of the plurality of the wall portions 402 expands to stretch the first solid skin 408 whereby after the cooling step (e) there is formed a regular array 432 of a plurality of the wall parts 434, each wall part 434 being formed from a respective wall portion 402. The regular array 432 of the plurality of the wall parts 434 comprises an array of substantially pyramidal, conical or part-spherical convex wall parts 434. Each of the convex wall parts 434 comprises a core layer 436 of expanded cellular foam between opposed skin layers 438, 440 consisting of a three-dimensionally shaped first solid skin part 438 part defining the convex surface 442 of the convex wall part 434 and a substantially smooth second solid skin part 444. The convex wall parts 434 are spaced from the adjacent convex wall parts 434 by an area 446 of the plastic composition which is unexpanded. In this embodiment, the plan view of the unexpanded area 446 comprises an individual point, typically in the form of a circle, although in other embodiments the unexpanded area 446 may have other shapes and dimensions, and plural unexpanded areas 446 may be interconnected.

Figure 13:
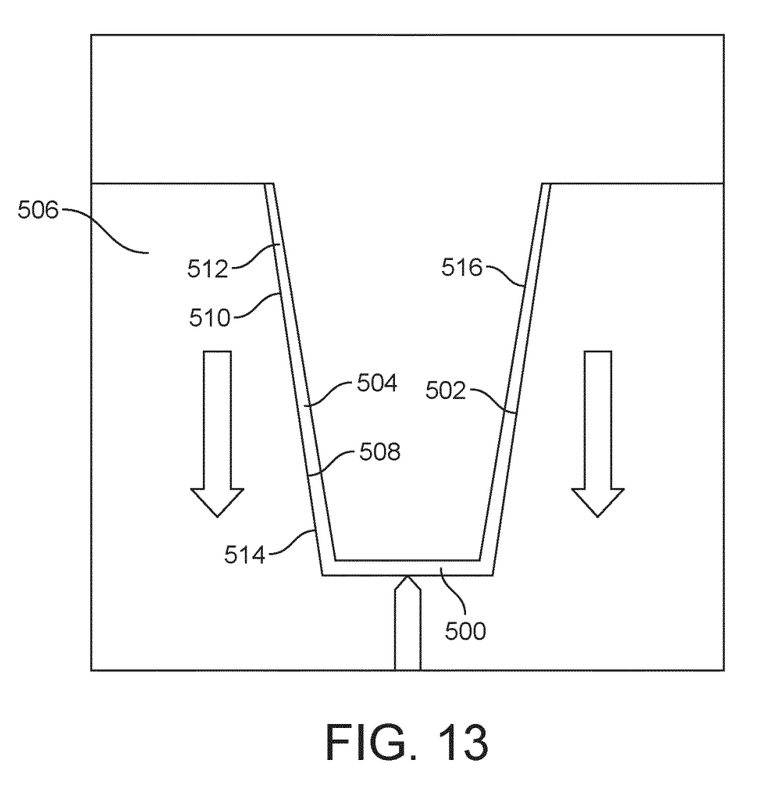
FIG. 13 is a cross-section of a mould for forming a hollow article in accordance with a method of a sixth embodiment of the present invention.
Figure 14:
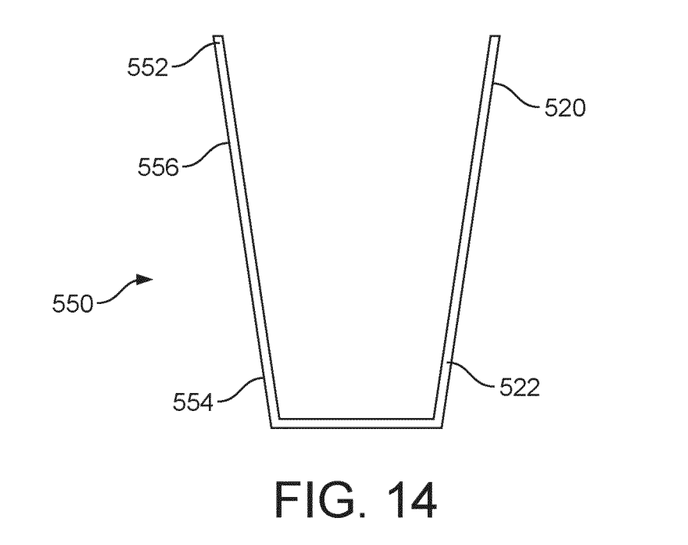
FIG. 14 is a cross-section of a hollow article made by the mould of FIG. 13.

FIG. 13 is a cross-section of a mould for forming a hollow article in accordance with a method of a sixth embodiment of the present invention. FIG. 14 is a cross-section of a hollow article made by the mould of FIG. 13. The hollow article is a cup in the form of a final expanded and moulded article 550, shown in FIG. 14, which has an upper open end 552 and a lower closed end 554, and a sidewall 556.

Referring to FIGS. 13 and 14, after the injecting step (c) and before the opening step (d), the plastic composition 500 forms a moulded intermediate article 502 within the cavity 504. In an initial phase of the opening step (d), as shown by the arrow in FIG. 13, the first mould part 506 is removed so that the first solid skin 508 is no longer in contact with the first cavity-forming surface 510. The initial removal of the first mould part 506 exposes a first end part 512 of the intermediate article 502 whereas an opposite second end part 514 of the intermediate article 502 remains in contact with the first and second cavity-forming surfaces 510, 516. Subsequently, the first mould part 506 is entirely removed so that the first solid skin 508 is entirely exposed, extending from the first end part 512 to the opposite second end part 514, as described above for the previous embodiments.

After the start of the initial phase, the first solid skin 508 at the first end part 512 of the intermediate article 502 is exposed, and therefore for the entire opening step (d) the first solid skin 508 at the first end part 512 of the intermediate article 502 is exposed for a greater time period than the first solid skin 508 at the second end part 514 of the intermediate article 502. In addition, the plastic composition at the first end part 512 is hotter than at the second end part 514 because the plastic composition at the first end part 512 has been in contact with the relatively cooler first mould part 506 for a shorter period than the plastic composition at the second end part 514 as a result of the first end part 512 being exposed before the second end part 514.

Accordingly, after the cooling step (e), the length of the first solid skin 508 at the first end part 512 of the final expanded and moulded article 550, shown in FIG. 14, has stretched by a greater stretch ratio than the length of the first solid skin 508 at the second end part 514 of the final expanded and moulded article 550. This is because the time to achieve stretching before cooling is greater for the first end part 512 than the second end part 514.

The first end part 512 of the intermediate article 502 is injection moulded to have a smaller wall thickness than the second end part 514 of the intermediate article 512, and this difference in thickness is highly exaggerated in FIG. 13. Typically, the wall thickness of the intermediate article 502 progressively tapers in increasing thickness in a direction from the first end part 512 of the intermediate article 502 to the second end part 514 of the intermediate article 502. This difference in thickness at least partly compensates for the greater stretch ratio for the length of the first solid skin 508 at the first end part 512 of the intermediate article 502 as compared to the second end part 514 of the intermediate article 502. Typically, the wall thickness of the first end part 512 of the intermediate article 502 is from 5 to 15% smaller than the wall thickness of the second end part 514 of the intermediate article 502. This reduced wall thickness at the upper end of the intermediate article 502 reduces excessive skin stretching in the upper end of the resultant article. As an example, for a typical container with a sidewall, for example having a height of 135 mm, which is inclined to a longitudinal axis of the container by an angle of 6 degrees, having a thickness of the second end part 514 of 0.7 mm, the thickness of the first end part 512 would be approximately 0.05 mm thinner than the second end part to avoid overstretching in the upper end of the container.

The first and second end parts 512, 514 of the intermediate article 502 form respective first and second wall portions 520, 522 of the final expanded and moulded article 550 shown in FIG. 14. The first and second wall portions 520, 522 typically have the same thickness within a tolerance of +/−0.5% based on a nominal thickness of the respective wall portions 520, 522.

In this embodiment of the present invention, the initial removal of the first mould part 506 exposes the first end part 512 of the intermediate article 502, typically to the atmosphere. This exposure causes the first solid skin at the first end part 512 to stretch as a result of expansion of the molten plastic composition in the central layer. In contrast, the opposite second end part 514 of the intermediate article 502 remains in contact with the first and second cavity-forming surfaces 510, 516, and so, in the initial phase, cannot expand or stretch. After the opposite second end part 514 has been subsequently exposed, which takes a finite time period, after the entire removal of the first mould part 506, the first solid skin 508 at the second end part 514 can subsequently stretch. Since the first solid skin 508 at the first end part 512 has a longer time to stretch than at the second end part 514, if it is desired to maintain in the final expanded and moulded article 550 a substantially constant wall thickness, the cavity thickness at the first end part 512 is made smaller than at the second end part 514, to compensate for the increased stretch ratio, associated with the increased stretch time, at the first end part 512 compared to the second end part 514. This enables, for example, a constant wall thickness to be formed despite there being higher skin stretch ratio at the upper open end 552 of the hollow article as compared to the lower closed end 554 of the hollow article.

In the illustrated embodiments of the present invention, the annular sidewall is linear in a longitudinal cross-section, and therefore the annular sidewall may be frusto-conical or frusto-pyramidal. In other embodiments of the present invention, the annular sidewall has an upper annular end remote from the base and a lower annular end adjacent to the base, the upper end has a larger circumference than the lower end, and the sidewall is curved in a longitudinal cross-section, and for example the article may be in the shape of a bowl having a large-diameter opening. In such embodiments, the stretch ratio in the outer first solid skin is higher at the upper annular end than at the lower annular end, as a result of the significantly larger circumference causing increased stretching of the outer first solid skin during formation of the expanded cellular foam core layer. In the preferred embodiments of the present invention, the article may be a cup, mug, bottle, basin, bowl, tray, container or vessel for containing a liquid of a food, for example a coffee cup, or a food tray. The container may have heat resistance and may be suitable for warming a drink or food in a microwave oven. The articles may be disposable or reusable, and in either case is recyclable since the article is composed of a single polymer, for example polypropylene.

Various modifications to the illustrated embodiments will be apparent to those skilled in the art and are intended to be included within the scope of the present invention as defined by the appended claims.

The invention claimed is:

1. A method of forming an article, wherein the article is a hollow container, the method comprising:
   (a) providing a mould having a first mould part and a second mould part, the first and second mould parts having respective first and second annular cavity-forming surfaces, wherein the first and second annular cavity-forming surfaces are macroscopically smooth and without any undulations;
   (b) closing the mould thereby defining an annular cavity between the first and second cavity-forming surfaces;
   (c) injecting a molten plastic composition comprising a polymer and a physical blowing agent into the cavity, wherein the physical blowing agent is a gas dissolved in the polymer, the molten plastic composition being injected at an injection pressure, wherein during or after the injecting step (c), the injected plastic composition in contact with the first and second cavity-forming surfaces is cooled to form first and second solid skins respectively adjacent to and in contact with the first and second cavity-forming surfaces, whereby in at least one annular region of the annular cavity is respectively located at least one annular portion of the plastic composition in which portion at least some of the plastic composition between the first and second solid skins remains molten, wherein the thickness of the annular portion is constant within a tolerance of +/−0.5% based on a nominal thickness of the annular portion, and wherein in the at least one annular portion the first and second solid skins are curved and parallel;

(d) opening the mould before the molten plastic composition between the first and second solid skins has solidified in the at least one portion, so as to expose the molten plastic composition of the annular portion to an external pressure lower than the injection pressure thereby allowing the molten plastic composition between the first and second solid skins of the annular portion to expand by foaming to form an expanded cellular foam as a result of the molten plastic composition beneath the first solid skin expanding outwardly away from the second solid skin which stretches the first solid skin in the annular portion, wherein the opening step comprises removing the first mould part so that the first solid skin is no longer in contact with the first cavity-forming surface; and (e) cooling the expanded cellular foam to cause the molten plastic composition between the first and second solid skins of the annular portion to solidify and to form in the article at least one first wall part comprising a core layer of cellular foam between the first and second solid skins, wherein the hollow container has an annular sidewall, and the first wall part is comprised in the annular sidewall and is both continuous and annular, wherein after the cooling step (e) the length of the first solid skin in the annular portion has stretched, as compared to the first solid skin present prior to the opening step (d), by a stretch ratio of from 0.5 to up to 3%, wherein the stretch ratio is the ratio of the increase in the length of the first solid skin after cooling step (e) based on length of the first solid skin before the opening step (d).

2. The method of claim 1, wherein the thickness of the annular portion is constant within a tolerance of +/−0.2% based on a nominal thickness of the respective portion.

3. The method of claim 2, wherein after the cooling step (e) the length of the first solid skin in the respective portion has stretched, as compared to the first solid skin present prior to the opening step (d), by a stretch ratio of from 2 to 3%.

4. The method of claim 1, wherein prior to the opening step (d), the at least one portion has a thickness of from greater than 0.5 mm to up to 1 mm and/or wherein after the cooling step (e), the at least one first wall part has a thickness of from 1 to 2 mm.

5. The method of claim 1, wherein from the opening step (d) to the cooling step (e), the at least one first portion has increased in thickness by from 1 to 1.5 mm to form the at least one first wall part.

6. The method of claim 1, wherein the article has an integral base, wherein at least one region of at least one, or both, of the annular sidewall and the base is respectively comprised by the at least one first wall part, and wherein a regular array of a plurality of wall parts of the at least one first wall part is comprised in at least one, or both, of the annular sidewall and the integral base, each of the wall parts of the plurality of wall parts being spaced from one or more adjacent wall parts of the plurality of wall parts by an area of the plastic composition comprising a core layer of expanded cellular foam having a lower expansion than the plurality of wall parts or by an area of the plastic composition which is unexpanded.

7. The method of claim 6, wherein the annular sidewall has an upper annular end remote from the base and a lower annular end adjacent to the base, the upper end has a larger circumference than the lower end, and the sidewall is curved in a longitudinal cross-section, wherein the stretch ratio is higher at the upper annular end than at the lower annular end.

8. The method of claim 1, wherein after injecting step (c) and before opening step (d), the plastic composition forms a moulded intermediate article within the cavity, and in an initial phase of the opening step (d) the removal of the first mould part so that the first solid skin is no longer in contact with the first cavity-forming surface exposes a first end part of the intermediate article whereas an opposite second end part of the intermediate article remains in contact with the first and second cavity-forming surfaces.

9. The method of claim 8, wherein after the start of the initial phase the first solid skin at the first end part of the intermediate article is exposed for a greater time period than the first solid skin at the second end part of the intermediate article whereby after the cooling step (e) the length of the first solid skin at the first end part of the final expanded and moulded article has stretched by a greater stretch ratio than the length of the first solid skin at the second end part of the final expanded and moulded article.

10. The method of claim 9, wherein the first end part of the intermediate article has a smaller wall thickness than the second end part of the intermediate article to at least partly compensate for the greater stretch ratio for the length of the first solid skin at the first end part of the intermediate article as compared to the second end part of the intermediate article.

11. The method of claim 10, wherein the wall thickness of the first end part of the intermediate article is from 5 to 15% smaller than the wall thickness of the second end part of the intermediate article and/or wherein the first and second end parts of the intermediate article form first and second wall portions of the final expanded and moulded article and/or wherein the first and second wall portions have the same thickness within a tolerance of +/−0.5% based on a nominal thickness of the respective wall portions.

12. The method of claim 10, wherein the wall thickness of the intermediate article progressively tapers in increasing thickness in a direction from the first end part of the intermediate article to the second end part of the intermediate article.

13. The method of claim 1, wherein during the injecting step (c) the injection pressure is at least 150 bar, at the end of the injecting step (c) a packing pressure of at least 150 bar is applied to the plastic composition in the cavity and during the opening step (d) the first solid skin is exposed to the atmosphere and the external pressure is atmospheric pressure.

14. The method of claim 1, wherein the first and second mould parts are, respectively, outer and inner mould parts forming outer and inner surfaces of the article, and further comprising the step, before injecting step (b), of providing an in-mould label at least partly surrounding the cavity, the in-mould label being located adjacent to the first cavity-forming surface, and wherein after the opening step (d) the in-mould label restricts stretching of the first solid skin formed adjacent thereto, wherein the in-mould label is annular and entirely surrounds the cavity and the in-mould label is composed of a length of a polymer layer which has opposed ends which are joined together at a seam to form an annular shape.

15. The method of claim 1, further comprising the step, between opening step (d) and cooling step (e), of disposing the moulded article into a second mould having a third mould part, the third mould part having a moulding surface, wherein the first solid skin is in contact with the moulding surface, and wherein after the opening step (d) the moulding surface controls stretching of the first solid skin in contact therewith.

16. The method of claim 15, wherein during the disposing step the moulding surface compresses the at least one first wall part to reduce the thickness of the core layer of cellular foam between the first and second solid skins and shrink the length of the first solid skin in the at least one wall part.

17. The method of claim 15, wherein the third mould part is hollow and the moulding surface defines a hollow cavity with a tapered surface, and during the disposing step the moulding surface is progressively urged against the first solid skin.

18. The method of claim 15, wherein the third mould part is at a lower temperature than the first mould part so that the first solid skin is cooled upon contact with the third mould part.

\* \* \* \* \*